2 Sheets—Sheet 2.
P. F. FLEMING.
HAY-RAKERS, LOADERS AND STACKERS.
No. 194,592. Patented Aug. 28, 1877.
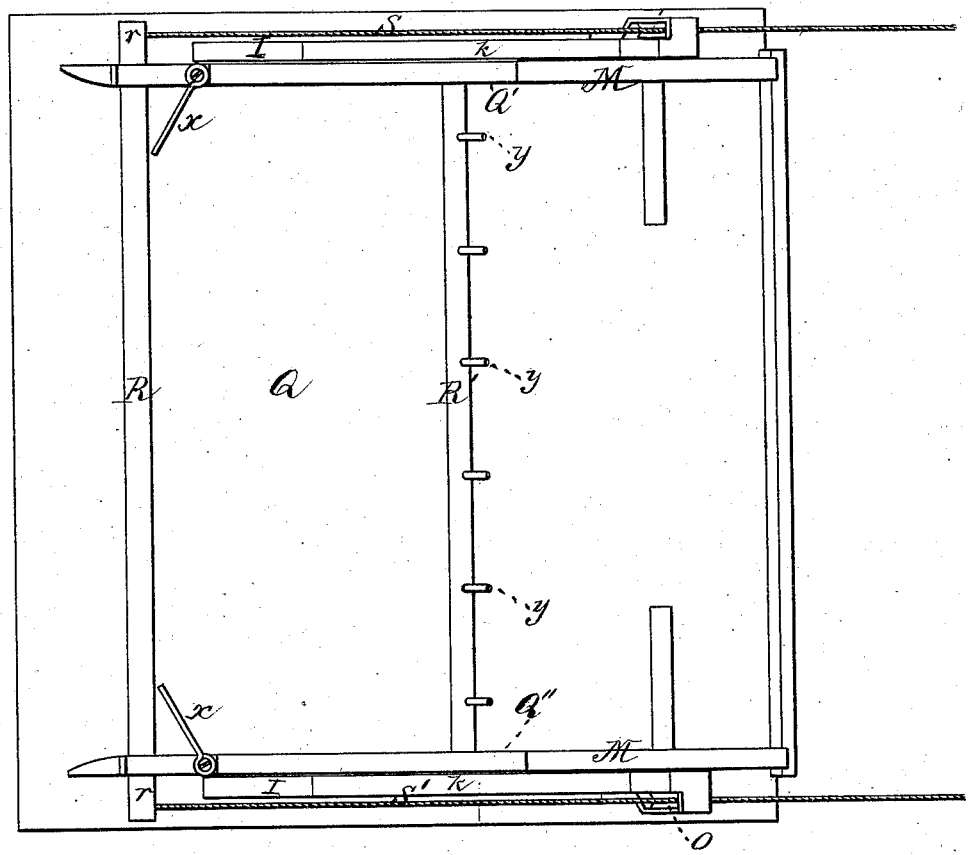
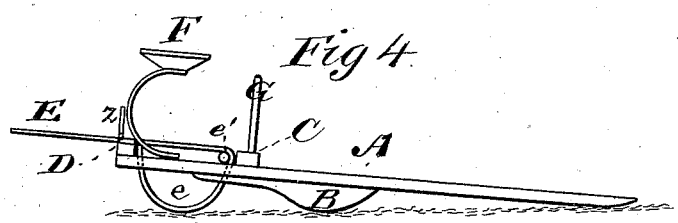
WITNESSES
Mary J. Utley.
Frank J. Masi
INVENTOR
Peter Field Fleming,
by E. W. Anderson,
ATTORNEY

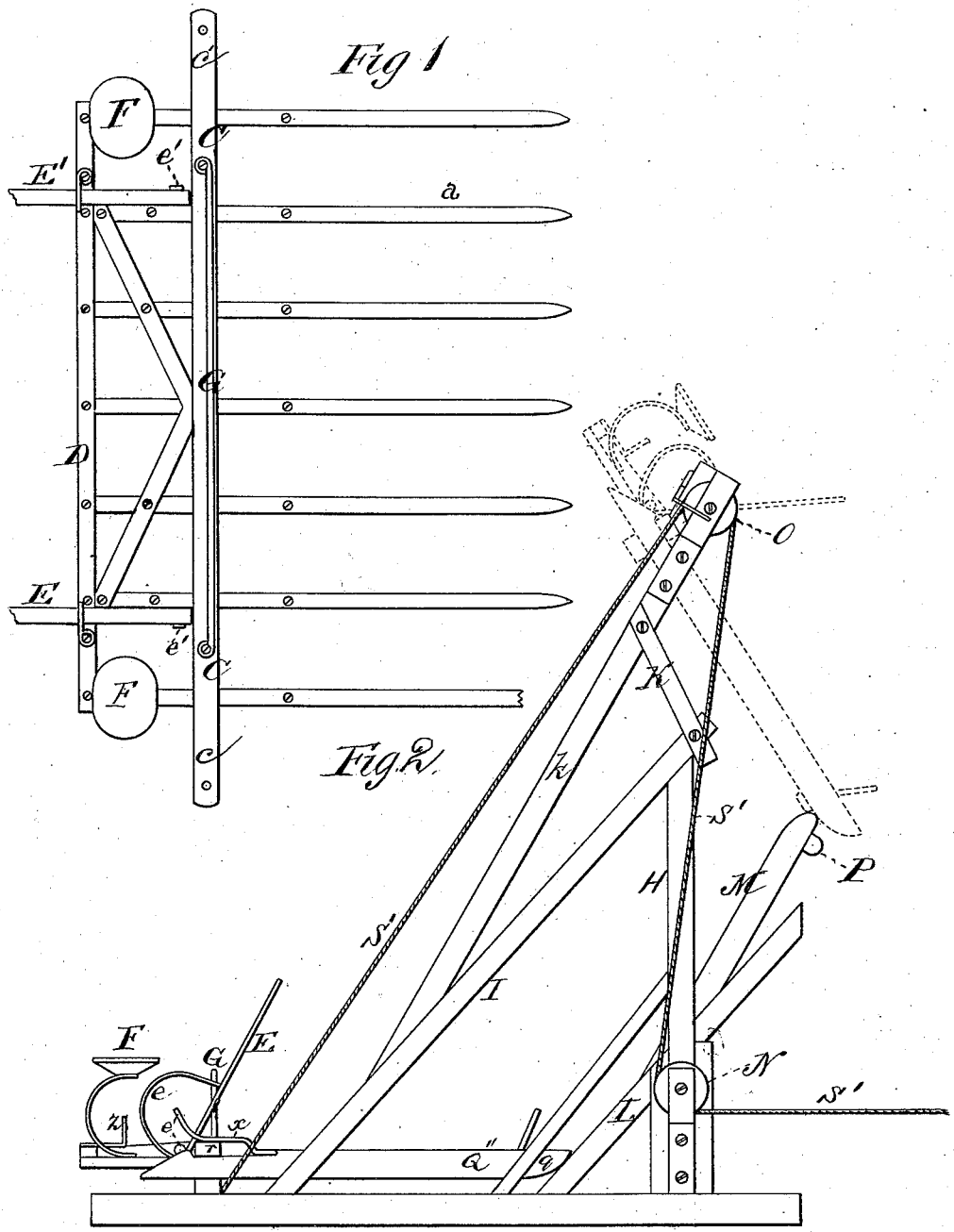

UNITED STATES PATENT OFFICE.

PETER FIELD FLEMING, OF SALISBURY, MISSOURI.

IMPROVEMENT IN HAY-RAKERS, LOADERS, AND STACKERS.

Specification forming part of Letters Patent No. 194,592, dated August 28, 1877; application filed June 23, 1877.

*To all whom it may concern:*

Be it known that I, PETER FIELD FLEMING, of Salisbury, in the county of Chariton and State of Missouri, have invented a new and valuable Improvement in Machines for Raking and Stacking Hay and Loading Wagons; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a top view of the rake. Fig. 2 is a side view of the derrick-frame, carriage, and rake. Fig. 3 is a top view of the carriage in position at the derrick, and Fig. 4 is a side view of the rake.

My invention relates to that class of hay rakers, stackers, and loaders in which a separate horse-rake gathers the hay, and is then elevated by a derrick, and caused by suitable guides to be dumped and discharge its load in a proper manner for stacking or loading.

It consists, generally, first, in arranging the rake upon short rocker-runners, which form a a fulcrum upon which the rake may be turned, so that its teeth point downward, and are kept close to the ground while raking hay, and raised when loaded; second, in an arrangement of devices for turning the rake on its runners; third, in a derrick-frame provided with a carriage or frame, upon which the rake is placed for hoisting, and guides for causing the rake to dump and discharge its load at a desired point.

A more particular description of the various devices and combinations which go to make up my operative improved apparatus will be given hereinafter, with reference to the accompanying drawings, in which—

A is the rake, to the lower sides of the teeth $a$ of which are secured runners B, shaped like rockers. C is a cross-beam, to which the teeth are secured, and the ends of which, $c\ c'$, project beyond the teeth. To these ends the horses are attached. At the rear end of these teeth is another cross-beam, D. E is a lever, having about half its length bent back under the other portion in the shape of a semicircle, $e$, and this bar is pivoted, at the beginning of the backward bend, as shown at $e'$, to cross-beam C, within reach of the driver's seat F, located on the end tooth of the rake. E' is a similar lever, correspondingly arranged at the other end of the rake. G is an arched brace on cross-beam C. H is a derrick-post, standing vertically and firmly braced. I is an inclined beam, the upper end of which is attached to the top of derrick H, its foot resting upon and secured to the ground at a distance from said derrick about equal to the length thereof. To the top of beam I is secured the foot of an inclined guide-beam, K, the top of which is elevated from said beam and supported by a brace, $k$. Near the front, and to the side of derrick H, is secured a short inclined beam, L, parallel to long inclined beam I. One end of this short inclined beam L rests upon and is secured to the ground, and the other end projects beyond and to the rear of the derrick H. Upon the upper side of the inclined beam L is arranged a short guide-beam, M, parallel to the guide-beam K. N is a grooved pulley journaled upon and near the foot of derrick H, and O is another grooved pulley journaled at the top of guide-beam K. The arrangement of derrick-post, beams, and pulleys just described forms one end of the derrick-frame or hoisting apparatus, the other end of which is constructed precisely the same, corresponding parts being indicated by similar letters in the drawings. A cross-beam, P, connects the top of short guide-beams M M.

Q is the carriage or frame upon which the rake is placed to be raised, and Q' Q'' are the runners or end pieces of said carriage. These runners are connected by bars R R'. The carriage Q fits between the ends of the derrick-frame, the curved inner ends $q\ q$ of the runners Q' Q'' striking against the inner edges of short inclined beams M. The ends of the bar R project outward beyond the runners Q' Q'', and strike against the outer edges of long inclined beams I and long guide-beams K. $x$ $x$ are catches for holding the rake to the carriage. S S' are ropes attached to the projecting ends $r\ r$ of bar R, passing upward over pulleys O, thence downward and under pulleys N, and outward to the rear of the apparatus, where they are joined together.

The operation of my invention is as follows: The derrick-frame or hoisting apparatus is erected wherever it is desired to build a stack or load wagons. The rake, being separated from the carriage and placed in the field, rests upon the short rocker-runners. Before starting the horses the driver presses down the levers E E' upon the rear cross-bars of the rake, where they are held by latches z z, thus causing the rear part of the rake to be raised upon the semicircles e e, turning on the runners B, and the points of the rake-teeth are turned downward to the ground in proper position for gathering hay. When the rake becomes loaded sufficiently the levers E E' are released from the latches z z, and fly upward, and the rear part of the rake sinks, causing the points of its teeth to turn upward, so as to prevent the hay from falling off in front, the load being prevented from slipping rearward by the arched brace G. The rake is then driven to the derrick-frame, the horses passing to the right and left of the ends of the frame, and drawing the loaded rake upon the carriage Q until the projecting ends c c' of cross-beam C of the rake are under the catches x x of the carriage, and the standards y, projecting upward from the front cross-bar of the carriage, are between the teeth of the rake.

The horses may now be detached from the rake and hitched to the outwardly-extending ends of ropes S S', pulling evenly upon which will cause the carriage and rake to move upward along the beams and guide-beams until the curved ends q q of runners Q' Q'' reach the tops of the short guide-beams M M, rearward over which said runners and the rake-teeth will pass, and be caused to point downward by the further rising of the rear part of the rake along the long guide-beams K K, until the carriage and rake assume the position (shown in dotted lines, Fig. 2) for dumping the load of the rake upon a stack or wagon.

What I claim as new, and desire to secure by Letters Patent, is—

1. The rake mounted upon runners B, in combination with levers E E', having semicircles e e', substantially as specified.

2. The combination of rake A, carriage Q, ropes L L, long guide-beams k k, and short guide-beams M M of the derrick-frame or hoisting apparatus, substantially as and for the purpose set forth.

3. The combination of carriage Q, having the runners Q' Q'', ropes S S', and catches X X, and the derrick-frame, having inclined guide-beams M M and K K, substantially as and for the purpose set forth.

In testimony that I claim the above I have hereunto subscribed my name in the presence of two witnesses.

PETER FIELD FLEMING.

Witnesses:
ELI WAYLAND,
SETH. H. POWERS.